June 10, 1941.  P. L. PENDLETON  2,245,080
COMPRESSION TESTING MACHINE
Filed Feb. 19, 1940  6 Sheets-Sheet 1

INVENTOR
Pyam L. Pendleton
BY
Pennie, Davis, Marvin & Edmonds
ATTORNEYS

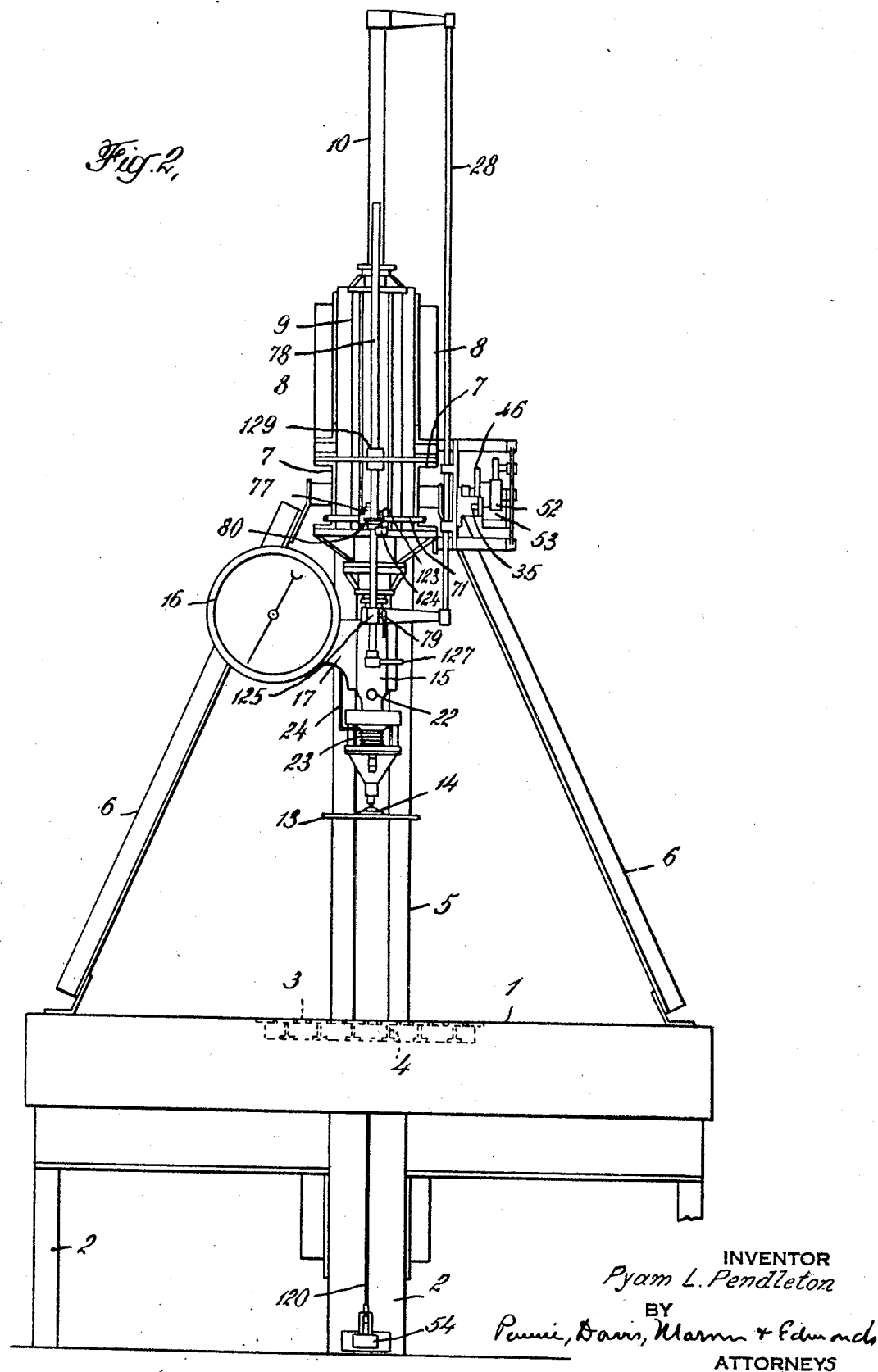

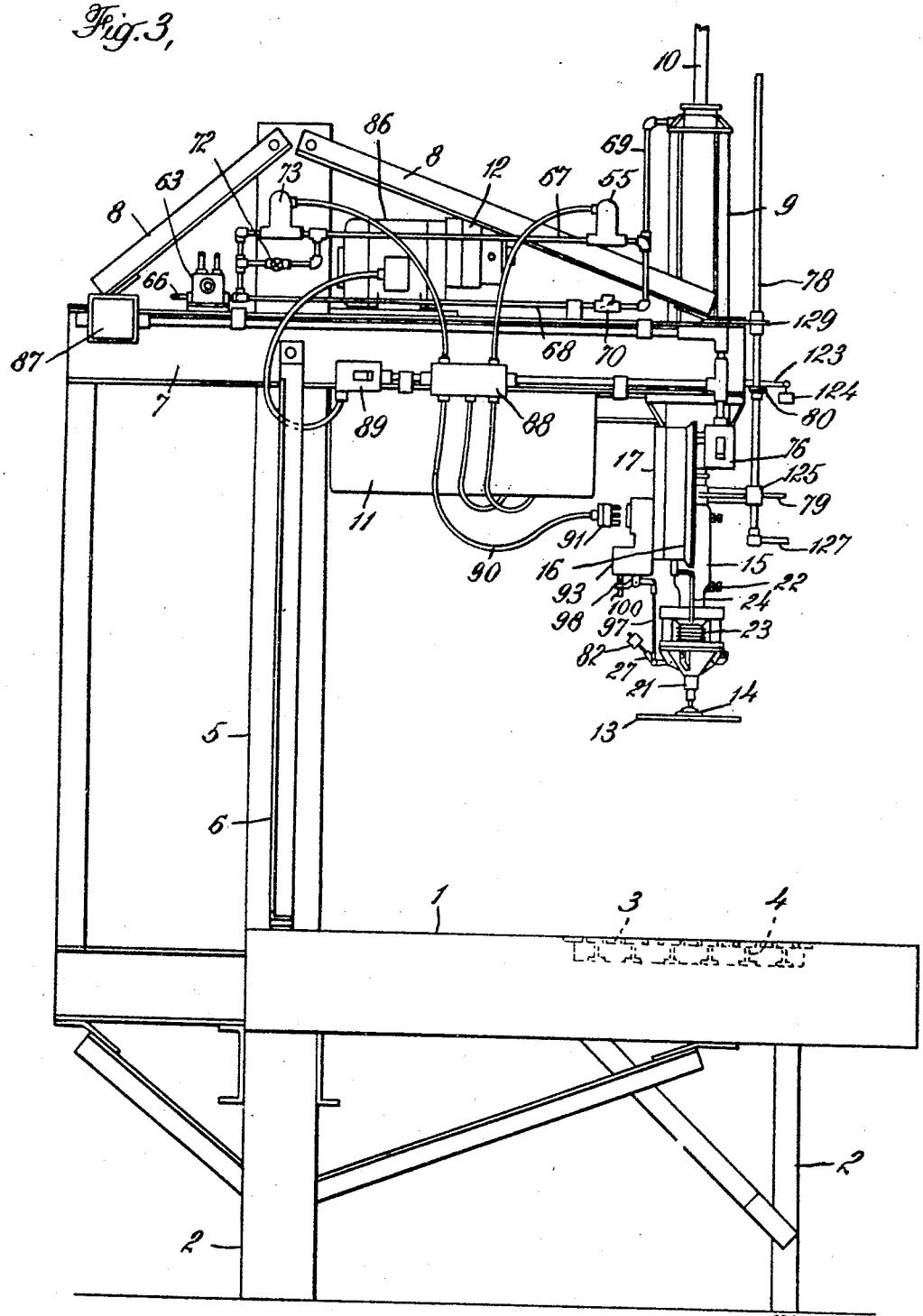

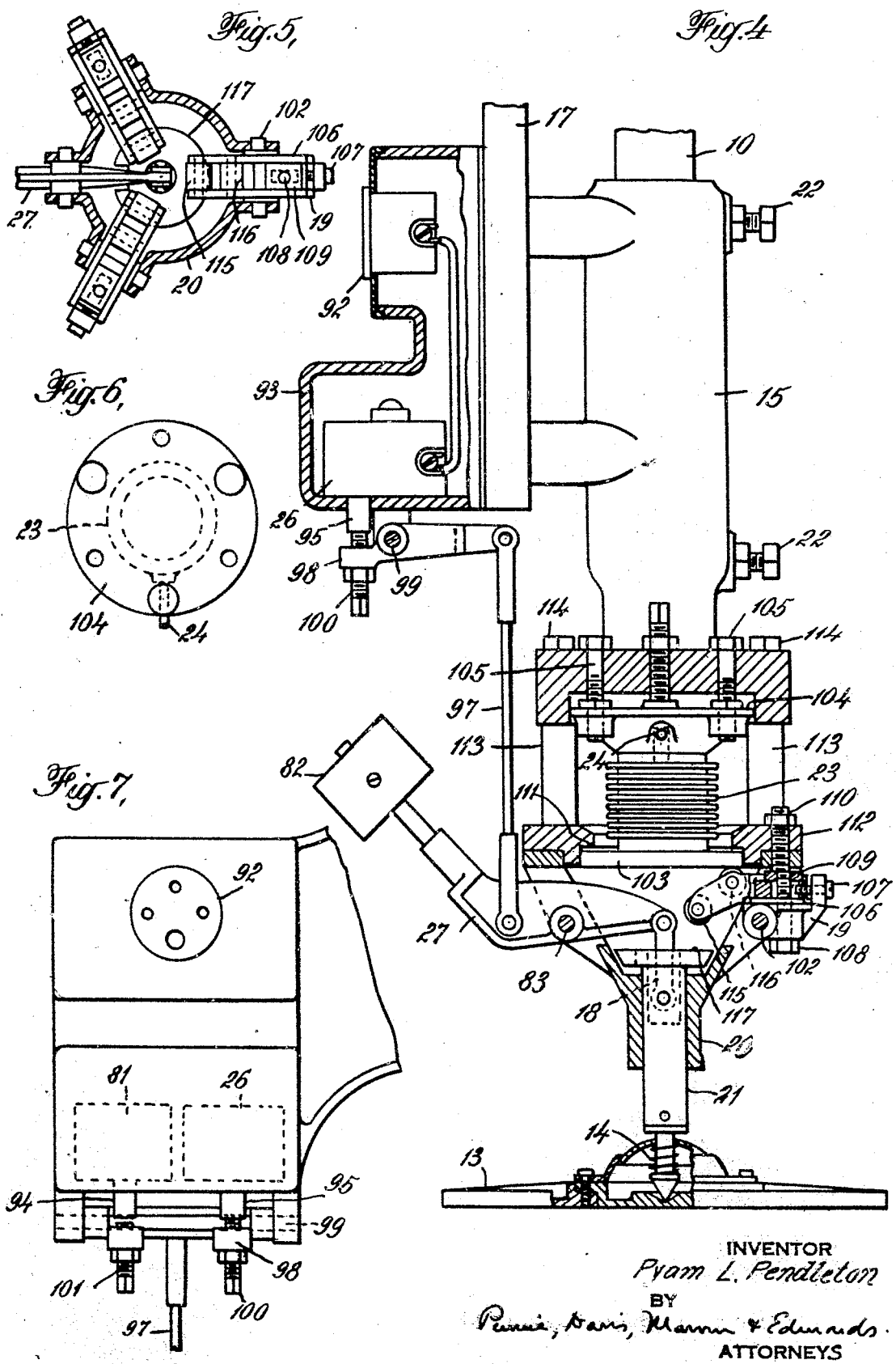

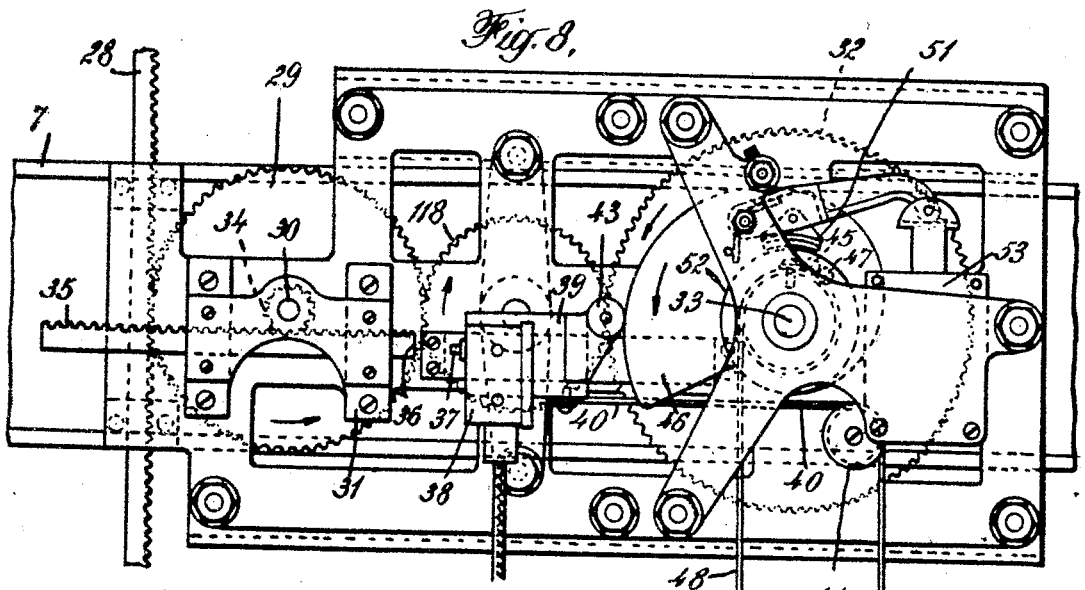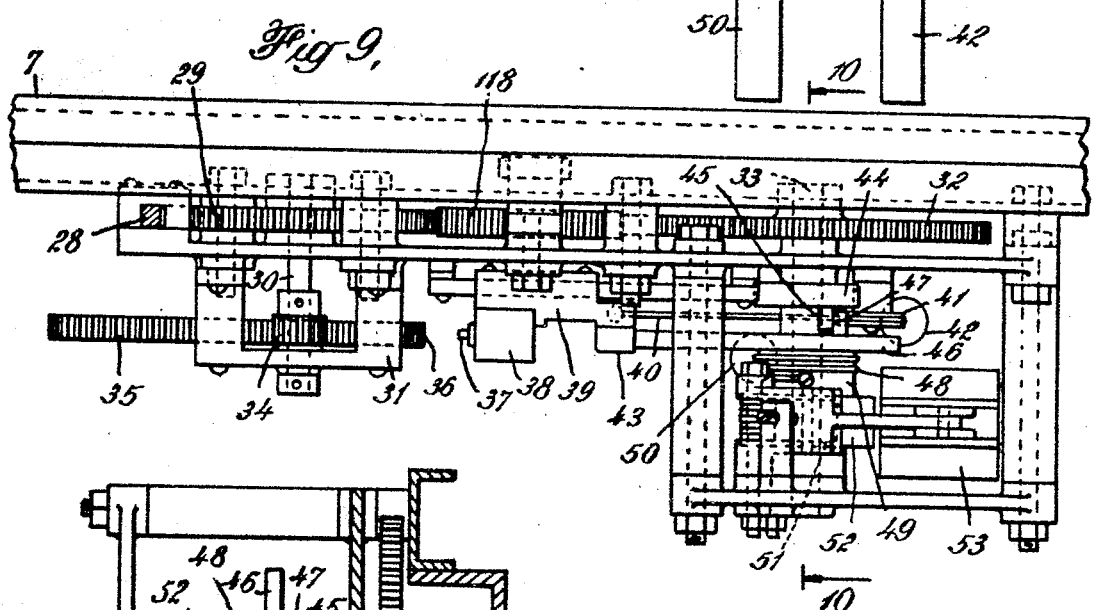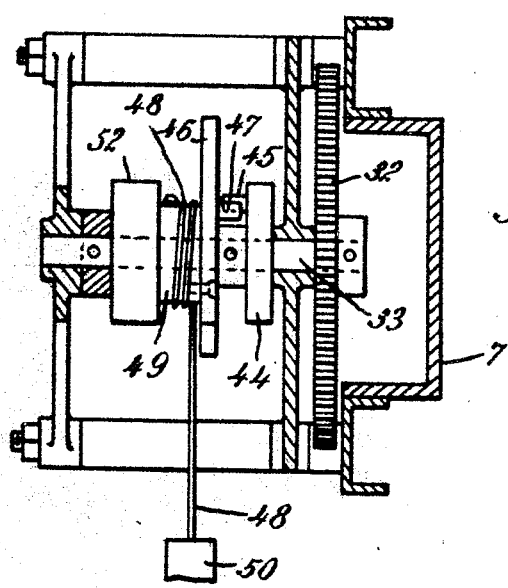

INVENTOR
Pyam L. Pendleton
BY
Pennie, Davis, Marvin & Edmonds.
ATTORNEYS

Patented June 10, 1941

2,245,080

UNITED STATES PATENT OFFICE 2,245,080

COMPRESSION TESTING MACHINE

Pyam L. Pendleton, Providence, R. I., assignor to Henry L. Scott Company, Inc., Providence, R. I., a corporation of Rhode Island Application February 19, 1940, Serial No. 319,604

7 Claims. (Cl. 265—14)

This invention relates to compression testing machines and more particularly to an apparatus for measuring, in pounds per square inch, the pressure required to produce a constant percentage of compression in specimens of variable thickness.

A desirable form of compression test establishes before hand a uniform percentage of compression for a group of specimens of varying free or preload heights and then measures and indicates the load required to produce this percentage in each instance. Every specimen must be measured for free or preload height and the corresponding deflection or compressed height computed in order to make such a test.

This machine has been developed to handle such percentage compression tests on quantity production of specimens having varying preload height and to save the time usually lost in measuring the preload and compressed height in each test and in computing deflection or percentage compression. It will automatically indicate in each test the load required to produce a constant predetermined percentage of compression in specimens of varying preload height.

This effect is produced by an automatic percentage compression control mechanism which begins to function in the machine cycle after the pressure foot has established a uniform degree of pressure contact with each specimen in the form of a light predetermined preload.

The efficiency of the mechanism is assisted by the provision of a pressure foot counter-balanced for the required preload and having a degree of slip motion with respect to the compression motion, said compression motion not occurring until after the completion of said slip motion which functions to actuate the automatic percentage compression control mechanism simultaneously with the beginning of compression and to change the machine speed at this point if desirable. This slip motion of the pressure foot is a great advantage in the testing of soft rubber compounds as it allows time for vibrations due to the impact of the counter-balanced pressure foot with the specimen to disappear so that the automatic percentage measurement of compression may be made from a static preload height.

In carrying out the invention I provide a cylinder having a piston therein and means for exerting hydraulic pressure in the cylinder for raising and lowering the piston. A pressure foot is mounted on the piston and the vertical movement of the pressure foot is transmitted to the automatic percentage compression control mechanism. The automatic percentage compression control mechanism consists of a pair of movable members which, when in contact with each other, operate a switch to disconnect the machine from its source of power. Movement of these members is controlled by a cam and the relative rate of speed of the two members during downward movement of the pressure foot is altered when the pressure foot comes in contact with the specimen to be tested or when the preload is established. In other words, with the pressure foot 20 inches above the table, if the spacing of the two members of the percentage compression control mechanism were 2 inches and if no specimen is in the machine, the relative speed of these two members is such that they would come in contact with each other when the pressure foot traveled 20 inches or reached the table. If, however, the mechanism is set for a 25 percent compression test and the specimen being tested is 10 inches thick, the space between the members would be reduced to 1 inch when the preload pressure is established and during the next 2½ inch movement of the pressure foot to produce a 25 percent compression of the specimen, the relative movement of the two members would be changed so that they would come in contact with each other at the end of this 2½ inch movement of the pressure foot and thus operate the switch to arrest the further movement of the pressure foot.

In the accompanying drawings I have shown one embodiment of the invention. In this showing:

Fig. 2 is a front elevation;

Fig. 3 is a side elevation on the side opposit Fig. 1;

Fig. 4 is a detailed, sectional view of a portior of the mechanism on an enlarged scale;

Fig. 5 is a horizontal, sectional view through the plunger housing on which the pressure foot is mounted;

Fig. 6 is a detailed view of the bellows supporting plate;

Fig. 7 is an elevation at right angles to Fig. 1 showing the arrangement of the switches;

Fig. 8 is an enlarged, detailed side elevation of the automatic percentage control mechanism;

Fig. 9 is a plan view thereof;

Fig. 10 is a vertical, transverse, sectional view on line 10—10 of Fig. 9;

Figure 1:
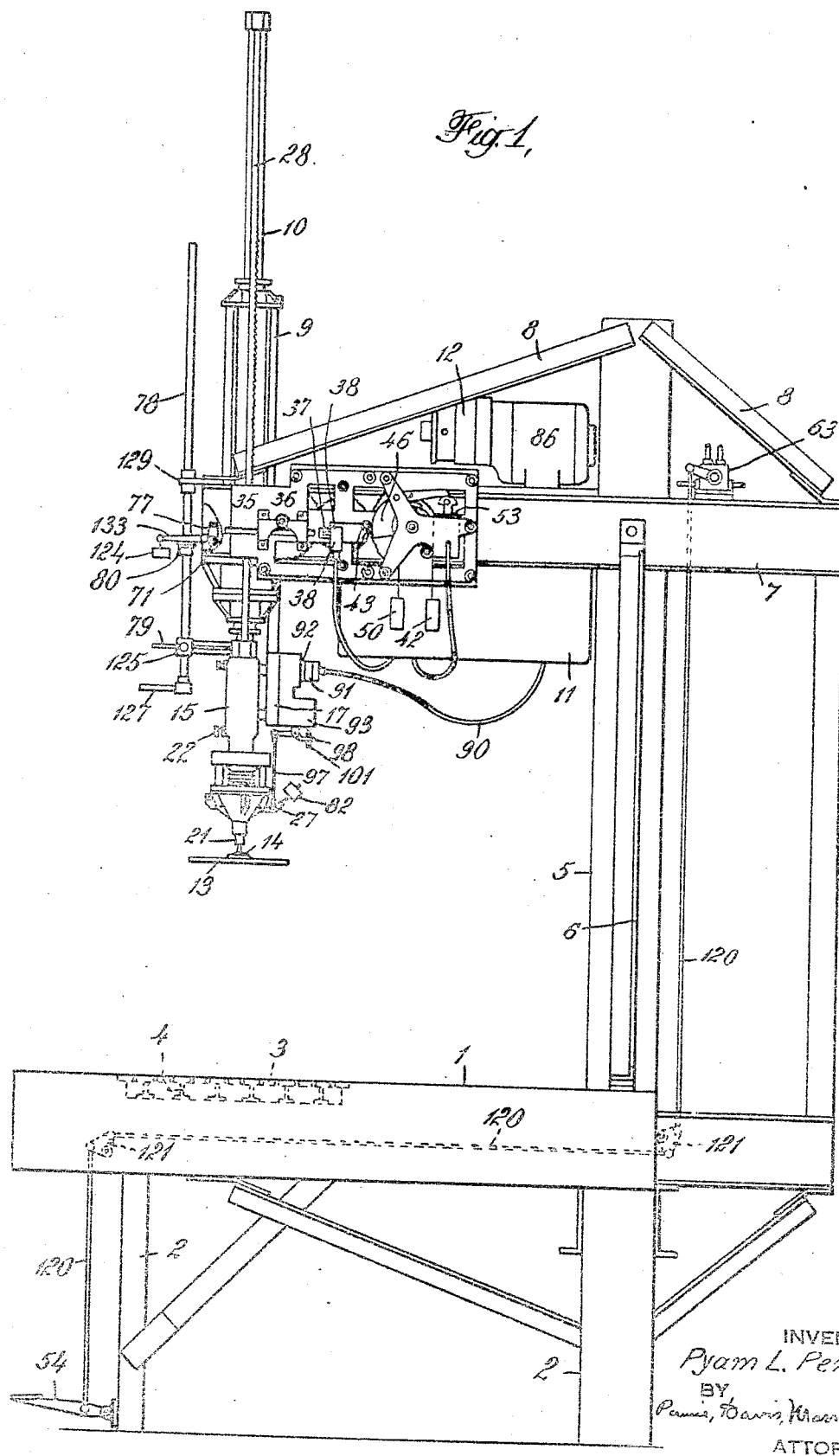
Fig. 1 is a right hand side elevation of the machine.
Figure 11:
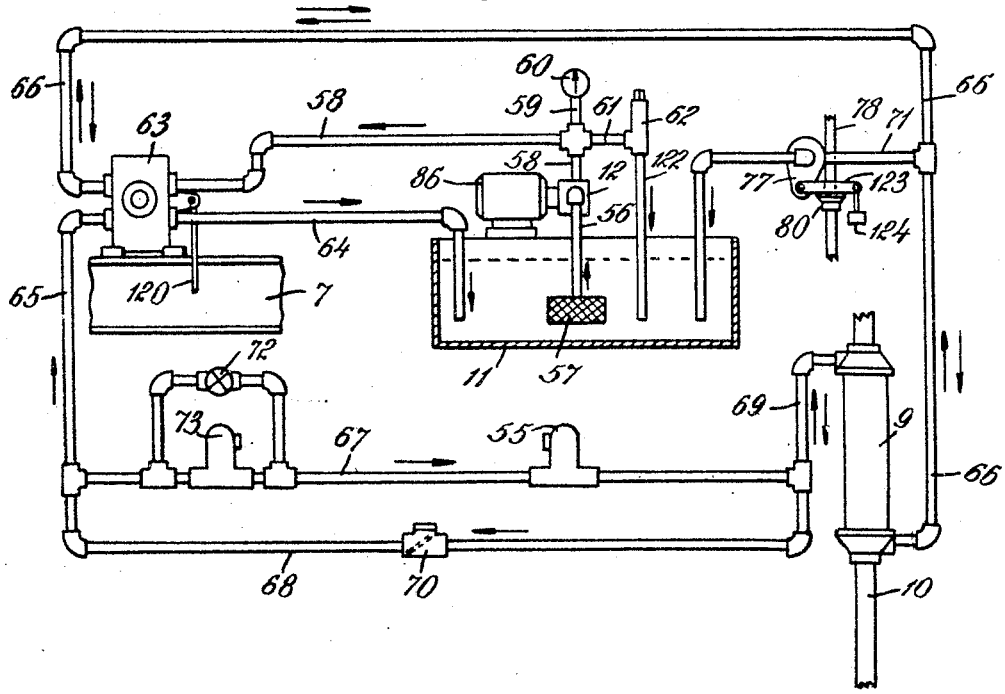
Fig. 11 is a diagrammatic view of the piping connections between the supply tank, pump and cylinder of the control valves therefor.

The machine comprises a table 1 supported on suitable legs 2. The table may be formed of any suitable material, such as wood, and is preferably provided with a central portion 3 formed of perforated metal and supported on suitable braces 4. The article or specimen to be tested is placed on the table. Extending upwardly from the table is a frame comprising a vertical channel bar 5 and suitable inclined braces 6. The testing mechanism is supported on this frame, the mechanism being carried by a bar 7 which extends horizontally above the table and is secured to the vertical bar 5. The bar 7 is also provided with suitable braces 8. A cylinder 9 is supported on the frame above the table in vertical position and a piston is mounted in the cylinder, the piston being provided with a piston rod 10. Fluid, such as oil or glycerine, is delivered to the upper or lower end of the cylinder from a supply tank 11 by means of a pump 12 and suitable conduits shown in Fig. 11 of the drawings. A sleeve 15 is supported on the piston rod and this sleeve in turn carries the pressure foot 13 and other associated parts of the mechanism. The pressure foot is attached to a plunger 21 by means of a pivot joint 14 or other convenient swiveling arrangement to provide a substantially parallel contact between the pressure foot and a specimen having a slanting top or irregular shaped top surface. Plunger 21 is mounted in a housing 20 and this housing is connected to a circular member 112 arranged at a distance from the bottom of the sleeve. The housing and circular member 112 are secured to the lower end of the sleeve by stud bolts 113 and nuts 114.

A plurality of levers 19 are pivoted in the housing, these levers being pivoted on pins 102 and being provided with rollers 115 at their inner ends which are adapted to be engaged by the flanged top 117 of plunger 21. Intermediate their ends the levers 19 are provided with rollers 116 which engage a plate 103 mounted on the lower end of bellows 23. The upper end of the bellows is connected to a flange 104 secured to the bottom of the sleeve by bolts 105. A compression gauge 16 is carried by a bracket 17 secured to the sleeve 15 and the bellows and the gauge are connected by a pipe 24, the pipe being preferably connected to flange 104 as shown. Bellows 23, pipe 24 and gauge 16 are filled with a relatively incompressible liquid. Upward pressure upon plunger 21, after flange 117 contacts with levers 19, is therefore transmitted to the compression gauge through bellows 23 and pipe 24 and can be visually read as fluid pressure on the gauge. After the contact of the flange and the levers further upward pressure is proportional to the reactance of the specimen under compression and the gauge may therefore be calibrated in terms of specimen reactance.

The gauge may be precalibrated in hydrostatic pounds pressure per square inch even though the bellows employed has an effective cross-sectional area greater than one square inch. This may be accomplished by proportioning the effective arms of levers 19 according to the cross-sectional area of the bellows. Thus if the effective area of the bellows is 2.24 square inches, the ratio of the lever arms to give a reading in hydrostatic pounds pressure per square inch would be 2.24:1.

The levers 19 may be further provided with extensions 106 to permit small compensating changes in the ratio of lever arms by means of adjusting screws 107. The extensions 106 are firmly held to levers 19 by clamp screws 108 and clamp nuts 109. This provides for minute differences in the spring rates of the bellows and of the Bourdon tube in the pressure gauge and for variations in manufacturing tolerances which would affect accuracy of calibration. Levers 19 are normally restrained in a position which maintains plate 103 in light contact with bellows 23 by means of set screws 110. Plate 103 is restrained against a degree of upward thrust which would damage bellows 23 or gauge 16 by an abutment 111 on the circular member 112.

A pair of switches 26 and 81 are arranged in a housing 93 carried by the bracket 17 and a receptacle 92 for a plug connection is also mounted in this housing. By means of the structure described, the sleeve 15, compression gauge 16, housing 93, bellows 23, pressure foot 13 and the parts associated therewith may be detached from the piston rod as a unit for service or repair. The parts are normally maintained in assembled position on the piston rod by set screws 22.

Switch 26 controls mechanism whereby the piston is caused to move at a slower rate during the period of compression after the pressure foot comes in contact with the specimen to be tested. For this purpose the plunger 21 is provided with a slip motion and, as shown in Fig. 4, moves upwardly in housing 20 a limited distance before contacting with the rollers 115. The switch 26 is actuated through the movement of the plunger by means of a link 18 which is connected to the plunger and has its other end connected to a lever 27 pivoted to the housing as at 83. The end of this lever is provided with a counter-weight 82. A connecting rod 97 connects lever 27 to lever 98 which is pivoted on the switch housing 93 as at 99. Lever 98 carries an adjustable contact screw 100 which actuates switch 26 through switch plunger 95. Actuation of the switch 26 restricts the flow of liquid to the top of the cylinder in a manner to be described and thereby provides a slow rate of motion of the piston during the succeeding period of compression. Switch plunger 95 is provided with a coil spring which permits over-travel after contact screw 100 engages it without restricting further motion of plunger 21.

After the pressure foot 13 has contacted with the specimen to be tested and plunger 21 has caused actuation of switch 26 as heretofore described, further depression of the piston causes further slip motion of the plunger 21 causing a second adjustable contact screw 101 to contact with switch plunger 94 of a second switch 81 which is mounted in housing 93. Switch 81 controls the automatic percentage compression control mechanism in a manner to be described. The engagement of adjustable contact screw 101 and switch plunger 94 occurs simultaneously with the contact of flange 117 of the plunger with levers 19. Further thrust from plunger 21 caused by the compression of the specimen is thus conveyed to the bellows and the pressure visually indicated on the gauge 16. After contact of the flange 117 with the rollers 115, plunger 21 will have no further upward motion with respect to the housing except that due to absorption of liquid from bellows 23 by the Bourdon tube in gauge 16 as it expands under pressure. This absorption will be very slight and can be neglected for ordinary purposes of percentage compression measurement. In cases where very accurate measure is desired this deflection can be measured and a correction chart provided to allow for it. For all practical purposes pressure foot may be considered as rigidly supported by sleeve 15 after the flange 117 has seated against the rollers 115.

The provision of the link and lever connection to provide slip motion of the plunger also provides convenient means for causing contact of the pressure foot with the specimen with a predetermined degree of light preload and to commence the process of measurement after said preload condition has been fulfilled. For this purpose the outer end of lever 27 may be provided with a counter-weight 82. The pressure foot may thus be balanced to provide any given degree of preload less than the weight of the pressure foot and plunger.

The automatic percentage compression control mechanism is mounted on the horizontal bar 7 and is best shown in Figs. 8 to 10 of the drawings. As shown a rack 28 is carried by the piston rod and this rack drives a gear 29 mounted on a shaft 30. The shaft 30 is journalled in suitable bearings carried by the bar 7 and a bracket 31 secured thereto. Gear 29 in turn drives gear 118 and this gear drives a gear 32 mounted on a cam shaft 33. The shaft 30 is provided with a pinion 34 which meshes with a horizontal rack 35 forming one of the two relatively movable members of the automatic percentage compression control mechanism. The end 36 of this rack is adapted to engage an operating member 37 of a switch 38 mounted on a slide 39. A cable 40 is connected to the slide 39 and passes over a pulley 41 mounted on the frame. A suitable weight 42 is attached to the end of this cable. Slide 39 also carries a roller 43 adapted to engage a control cam. As shown in Fig. 10 of the drawings the cam shaft 33 is provided with a disc 44 carrying a projecting pin 45 which forms one element of a slip-clutch. The control cam 46 is loosely mounted on shaft 33 and is provided with a similar pin 47 which cooperates with the pin 45 to drive the cam in a clockwise direction upon upward movement of the piston rod. The cam is driven in a counter-clockwise direction on the downward stroke of the machine by means of a cable 48 arranged on a hub 49 of the cam and having a weight 50 at its lower end. On the downward movement of the piston rod, rotation of disc 44 in a counter-clockwise direction moves pin 45 away from pin 47 permitting the weight 50 to function and drive the cam in a counter-clockwise direction. Movement of the cam is controlled by a brake shoe 51 engaging an extension 52 of the hub 49 and in turn controlled by a solenoid 53.

Flow of liquid from the reservoir 11 to the cylinder 9 is controlled by a pedal 54 which may be depressed and held by the operator for the duration of the compression cycle or held by a releasable latch. Pedal 54 is connected to a four-way valve 63 (Fig. 11) by rods 120 and cranks 121, a spring in the valve serving to return the pedal to normal inoperative position after depression.

As shown the pump 12 is connected to the liquid in the reservoir through a pipe 56 having a strainer 57 at its lower end and this pump communicates with a feed pipe 58. The pipe 58 may be provided with a branch 59 connected to a pressure gauge 60 and with a branch 61 connected to a relief valve 62 and having an outlet 122 extending into the tank. Pipe 58 communicates with valve 63 and an exhaust or return pipe 64 also communicates with this valve and the reservoir. The valve 63 is further provided with pipes 65 and 66 communicating with the top and bottom of cylinder 9. As shown pipe 65 is provided with two branches, one of which serves as a feed pipe and is shown at 67 and the other of which serves as a return pipe and is shown at 68. These two pipes are connected through a common connection 69 to the top of the cylinder and the return pipe 68 is provided with a suitable check valve 70.

Pipe 66 connects valve 63 to the bottom of the cylinder and has a branch connection 71 leading to the reservoir through a valve 77 kept normally closed by a weight 124 on the valve lever 123. A shaft 78 is slidably mounted in a bracket 125 mounted on the piston rod 10 and provided with a handle 127. Shaft 78 is rigidly and adjustably positioned in bracket 125 by a clamp screw 79. Shaft 78 is also journaled in a bracket 129 mounted on channel beams 7 and provided with a flanged section 80 which engages with valve lever 123 on the upstroke of the piston to open valve 77 and exhaust the fluid pressure from 66 directly into the reservoir at any height of the pressure foot 13 from the table which may be predetermined by the position of shaft 78 with respect to bracket 125 and clamp screw 79. The adjustment of position of shaft 78 is to provide a convenient means for limiting the height to which the pressure foot will rise from the table relative to the height of specimens.

Figure 12:
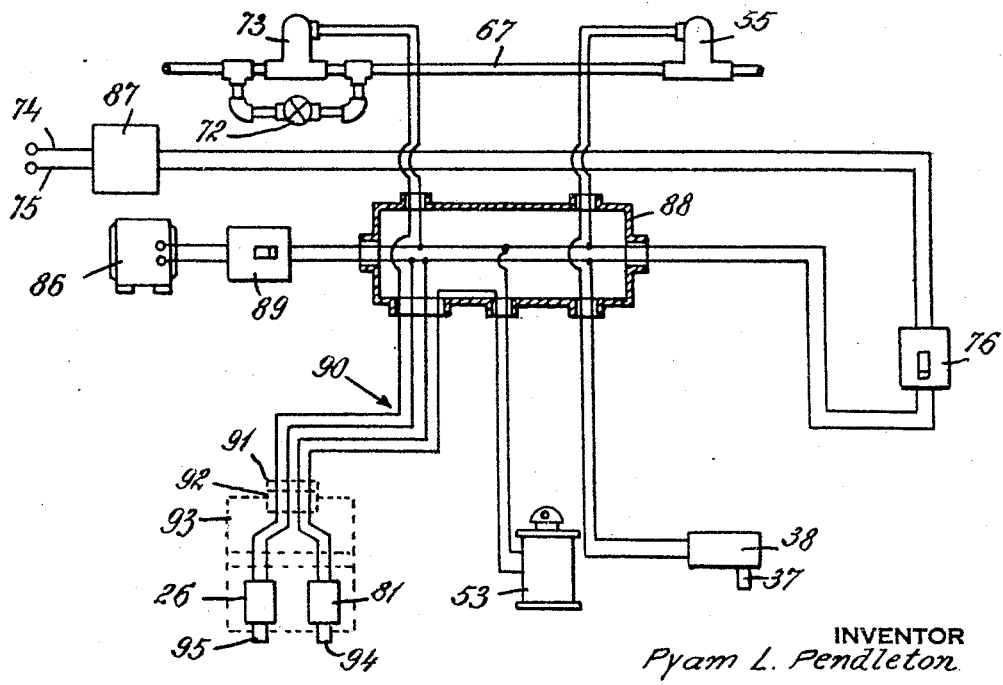
Fig. 12 is a diagrammatic view of the electric circuits and control switches.

The circuit and circuit controls are shown in Fig. 12 of the drawings, the reference numerals 74 and 75 designating the main supply and being provided with a suitable switch 76. A fuse cutout box is provided at 87 and a junction box at 88. Line wires 74 and 75 are connected to motor 86 through a separate motor switch 89. Switch 26 energizes a solenoid valve 73 and switch 81 energizes solenoid brake 53. Energization of valve 73 slows the rate of travel of the piston to a rate predetermined by the setting of by-pass valve 72 and energization of solenoid 53 operates the brake 51 to stop the movement of the cam 46 during that portion of the piston stroke when the specimen is under pressure. Switch 38 is connected to solenoid valve 55 to shut off the fluid supply to cylinder 9 and stop the piston when the end 36 of the rack engages plunger 37 and actuates the switch. The portion of the wiring shown at 90 includes a four conductor flexible cable and plug 91 by means of which the parts associated with slide 15 may be quickly detached from the machine for repairs or service.

In the operation of the device, movement of the piston in an upward direction rotates the gear 29 in a clockwise direction and causes the rack 35 to move toward the left to increase the distance between the end 36 of this rack and the limit switch 38. At the same time, the gear 32 is rotated in a clockwise direction and engagement of pins 45 and 47 causes the cam to be rotated in the same direction to move the slide 39 toward the left but at a slower speed than the movement of the rack 35. The movement of the slide will, of course, depend upon the contour of the cam. As variations in the time interval of compression are in direct proportion to variations in the height of the specimens being tested for any uniform percentage, cam 46 is generated in the form of a regular spiral with a rate of increase or spiral lead directly proportional to the rate of increase in the compression time interval with an increase in specimen thickness. Cam 46 is selected for the particular amount of compression to be performed on the specimen to be tested and different cams are employed for different amounts of compression. Movement of the slide to the left by the clockwise movement of the cam lifts the weight 42 and the weight therefore tends to lower and move the slide to the right whenever the cam will permit such movement. When the pressure foot starts downwardly and gears 29 and 32 rotate in a counter-clockwise direction, the rack 35 moves toward the right in Figs. 8 and 9 of the drawings and as the gear 32 rotates, the pin 45 moves in a counter-clockwise direction and permits the cam to be lowered by the weight 50 but limits the rate of movement of the cam by the speed at which the pin 45 moves. Until the predetermined preload pressure is established, the cam moves in a counter-clockwise direction and the weight 42 moves the slide 39 and the limit switch 38 toward the right but at a slower rate of speed than the movement of the rack 35 so that the space between the contact members 36 and 37 is decreased.

Before the completion of the slip motion of plunger 21, switch 26 is actuated to energize solenoid valve 73 and cause the liquid to flow to the top of the cylinder at a slower rate through by-pass valve 72. When the predetermined preload pressure is established and the slip motion of plunger 21 completed, the plunger is retracted in housing 20 and has contacted bellows 23 and simultaneously actuated switch 81 to energize solenoid 53 and operate the brake shoe 51 to engage the brake drum 52. This prevents further movement of the cam 46 so that the slide 39 is held stationary during the continued downward movement of the pressure foot during which the specimen is compressed beyond the preload compression. The rate of closure of the contacts 36 and 37 is thus increased and when the specimen has been compressed the predetermined percentage, or in other words, the pressure foot has traveled a distance corresponding to the desired predetermined compression without reference to preload compression, the end 36 of rack 35 engages the operating member 37 of switch 38 and through valve 55 fluid pressure is cut off from cylinder 9 and the movement of the pressure foot is arrested. The gauge 16 registers the specimen reactance throughout the compression of the specimen without reference to preload through the bellows 23 and the closed system 24. The detailed construction of these parts is conventional and further description thereof is deemed to be unnecessary.

The delivery of fluid from the reservoir 11 to the upper end of the cylinder 9 to cause the downward movement of the piston and piston rod 10 is controlled by the valves 63 and 55, through pedal 54 and its connections. After the completion of the test as above described, the operator releases pedal 54, allowing the spring in valve 63 to reverse the valve and deliver the fluid to the bottom of cylinder 9 raising the pressure foot clear of the specimen. As stated above, the upward movement may be automatically controlled and limited by the graduated rod 78 and at the proper time in the upward movement, after the pressure foot has been moved a slight distance above the specimen, the flange 80 operates valve 77 to by-pass the fluid and stop the upward movement.

I claim:

1. Apparatus of the character described comprising a table, a pressure foot mounted over the table, means for moving the pressure foot toward the table and control means therefor, said control means comprising a pair of relatively movable members, a switch operable upon predetermined pressure contact of the pressure foot with the specimen to be tested, a cam controlling the movement of one of said members, a brake associated with the cam, and means controlled by the switch for actuating the brake.

2. Apparatus of the character described comprising a cylinder, a source of liquid supply, a pump, a motor for operating the pump, means for delivering liquid to the ends of the cylinder, a liquid control valve in said means, a piston in the cylinder, a piston rod extending from the cylinder, a pressure foot carried thereby, a pair of movable members, means controlled by the movement of the piston rod for moving said members at different speeds, means for arresting the movement of one of said members, and a limit switch operated by said movable members and connected to the liquid control valve.

3. Apparatus of the character described comprising a cylinder, a source of liquid supply, a pump, a motor to drive said pump, means for delivering liquid to the ends of the cylinder, a solenoid operated liquid control valve in said means, a piston in the cylinder, a piston rod associated therewith, a pressure foot carried by the piston rod, a limit switch connected to the liquid control valve, a pair of movable members, a cam actuated by the movement of the piston rod controlling one of said members, and a rack actuated by the movement of the piston rod for controlling the other of said members, said limit switch being actuated by said movable members.

4. Apparatus of the character described comprising a movable pressure foot and control means therefor, said control means comprising a pair of relatively movable members, a switch actuated thereby, one of said members comprising a rack controlled by the movement of the pressure foot, a cam controlled by the movement of the pressure foot for permitting movement of the other of said members, means for moving said other member, and means controlled by the actuation of the switch for arresting the movement of the pressure foot.

5. Apparatus of the character described comprising a movable pressure foot and control means therefor, said control means comprising a pair of relatively movable members, a switch operatively associated with said members, one of said members comprising a rack controlled by the movement of the pressure foot, a cam controlled by the movement of the pressure foot for permitting movement of the other of said movable members, means for moving said other member, a brake for said cam, and a solenoid for actuating the brake.

6. Apparatus of the character described comprising a table, a pressure foot mounted over the table, means for moving the pressure foot toward the table and control means therefor, said control means comprising a pair of relatively movable members, a switch operable upon predetermined pressure contact of the pressure foot with the specimen to be tested, a cam controlling the movement of one of said members, means controlled by the switch to arrest the movement of the cam, a switch operable upon initial engagement of the pressure foot with a specimen to be tested, and means controlled by said switch for altering the speed of the pressure foot.

7. Apparatus of the character described comprising a cylinder, a piston in the cylinder, a piston rod associated therewith, a sleeve mounted on the piston rod, a housing carried by the sleeve, a pressure foot mounted in the housing, a bracket carried by the sleeve, a pressure gauge mounted on the bracket, a bellows carried by the sleeve, a pipe connecting the bellows and the gauge and forming a closed liquid system, and means for transmitting thrust from the pressure foot to the bellows, the sleeve and its associated parts being removable as a unit from the piston rod.

PYAM L. PENDLETON.